United States Patent Office 3,546,551
Patented Dec. 8, 1970

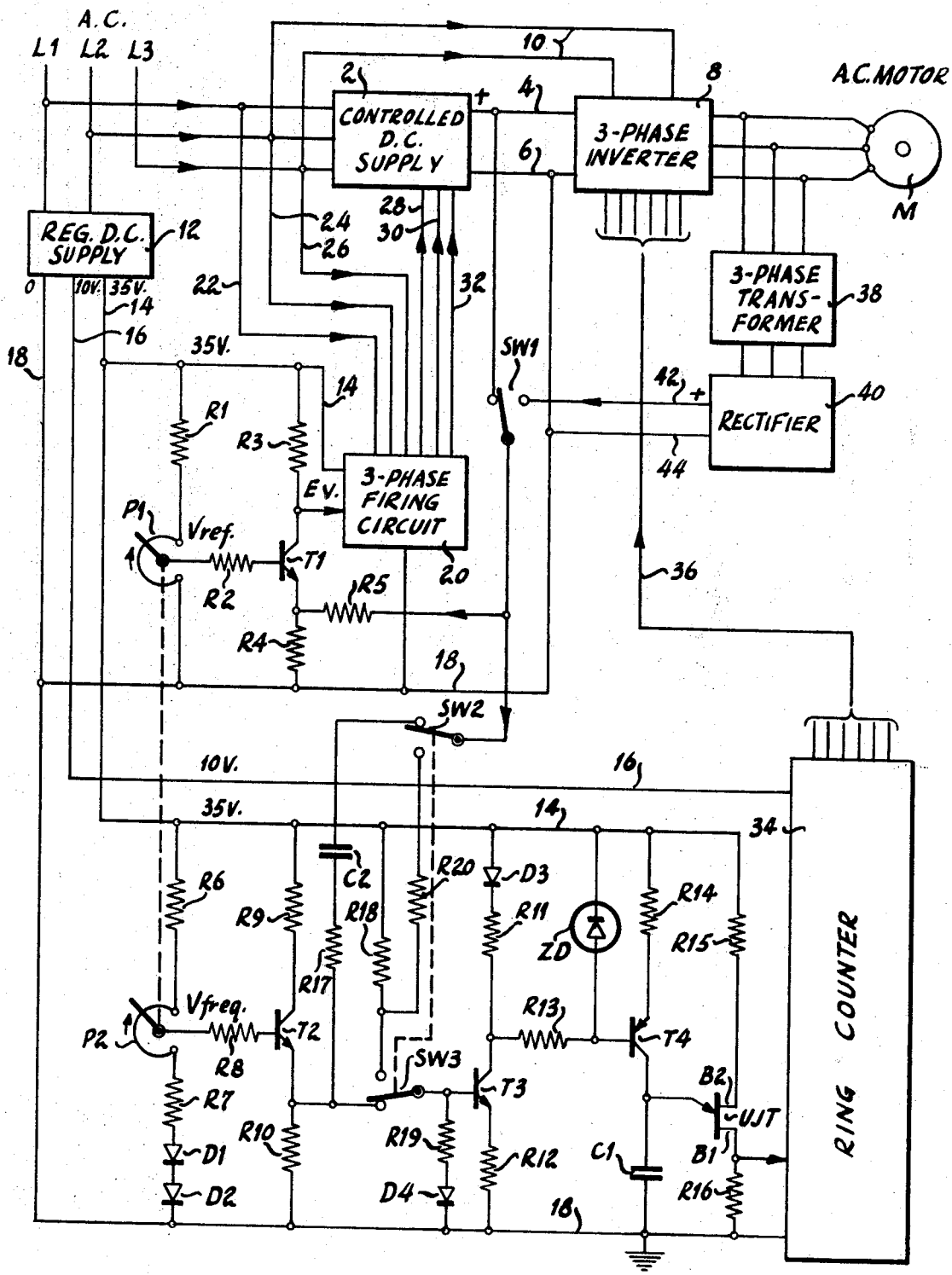

3,546,551
ADJUSTABLE FREQUENCY CONTROL SYSTEM HAVING FEEDBACK FOR VOLTAGE AND FREQUENCY REGULATION
Robert L. Risberg, Milwaukee, and Charles E. Smith, Wauwatosa, Wis., assignors to Cutler-Hammer, Inc., Milwaukee, Wis., a corporation of Delaware
Filed Mar. 27, 1969, Ser. No. 810,942
Int. Cl. H02p 5/40
U.S. Cl. 318—227                        10 Claims

ABSTRACT OF THE DISCLOSURE

An adjustable frequency control system supplied from a three-phase A.C. source for controlling the speed of a three-phase A.C. motor by concurrent voltage and frequency control. For voltage control, rectifying means supplied from the source is controlled by a selectively adjustable voltage error signal circuit to provide an adjustable D.C. voltage to a three-phase inverter that supplies the motor. The voltage error signal is obtained from a first manually adjustable device and a voltage reference circuit that provides a voltage proportional to the steady state D.C. voltage and a circuit providing a feedback voltage signal proportional to power output voltage. For frequency control, a resettable voltage integrator circuit having a periodic output, determinative of the frequency control to a ring counter, controls firing of the inverter switching devices thereby to control the output frequency to the motor. The voltage to be integrated is obtained from a second manually adjustable device, coupled to the first manually adjustable device for operation in unison, and a frequency reference circuit that provides a voltage proportional to steady state frequency, and a RC coupling circuit between power output voltage and the integrator that provides a voltage signal proportional to the variation in power output voltage. For either voltage control or frequency control the power output voltage signal may be obtained from the adjustable D.C. voltage as modified by motor speed feedback or from the inverter output through an isolating transformer and rectifier. Alternatively, direct coupling may be used to couple a voltage output signal from the inverter output through such isolating transformer and rectifier to the resettable voltage integrator circuit in place of both the steady state frequency reference and RC coupling.

BACKGROUND OF THE INVENTION

Adjustable frequency control systems have been known heretofore such as that disclosed in R. L. Risberg Pat. No. 3,344,326, dated Sept. 26, 1967. This invention relates to improvements thereon.

SUMMARY OF THE INVENTION

This invention relates to adjustable frequency control systems and to improved frequency control and regulating means therein.

An object of the invention is to provide an improved adjustable frequency control and regulating system.

A more specific object of the invention is to provide a control system of the type having selective adjustment of voltage and frequency in unison with improved means for regulating the frequency as a function of output voltage.

Another specific object of the invention is to provide an improved adjustable frequency control system wherein flux integral control is accomplished by a RC transient coupling between power output voltage and frequency, and steady state frequency is selectively settable independently of the output voltage.

Other objects and advantages of the invention will hereinafter appear.

BRIEF DESCRIPTION OF THE DRAWING

The single figure of the drawing shows a circuit diagram of an adjustable frequency control system constructed and arranged in accordance with the invention and showing switches that can be set to provide several alternative connections.

DESCRIPTION OF THE PREFERRED EMBODIMENTS

Referring to the drawing, there is shown a system supplied from an alternating current source A.C. for controlling the speed of an alternating current motor M. Power supply lines L1, L2 and L3 connect the three-phase source A.C. to a controlled D.C. supply circuit 2.

This controlled D.C. supply circuit may be a suitable circuit that provides a selectively adjustable D.C. voltage, such as a semiconductor controlled rectifier bridge and filter, an uncontrolled diode bridge followed by a controlled chopper and filter, or the like.

The adjustable D.C. voltage output of supply circuit 2 is connected by a positive conductor 4 and a negative or zero voltage, common conductor 6 to a three-phase inverter 8. The three-phase output of the inverter is connected to motor M to supply adjustable frequency and proportionally adjustable magnitude operating voltage thereto. Pre-charging current is connected from power supply lines L2 and L3 through conductor pair 10 to the inverter. Since a suitable controlled D.C. supply and three-phase inverter including pre-charging circuits are conventional in the art, the details thereof have not been shown to avoid complicating the drawing. Reference may be had to the upper portions of FIGS. 2a, 2b and 2c of the aforementioned R. L. Risberg Pat. No. 3,344,326 for a detailed illustration thereof.

As shown in the drawing, supply voltages of 35 volts D.C. and 10 volts D.C. are required for the control circuits. For this purpose, power supply lines L1 and L2 are also connected to a conventional regulating and rectifying D.C. supply circuit 12. This circuit provides 35 volts positive on its output conductor 14, 10 volts positive on its output conductor 16 and zero volts on its common output conductor 18.

One of the aforementioned control circuits is a circuit for controlling controlled D.C. supply circuit 2. Assuming that the latter includes a three-phase controlled rectifier bridge of the semiconductor controlled rectifier (SCR) type, its control circuit comprises a voltage reference potentiometer and circuit and a three-phase firing circuit as shown at the midportion of the drawing. Potentiometer P1 is connected at one side through a resistor R1 to 35-volt conductor 14 and is connected at its other side to common conductor 18. The slider of this potentiometer is connected through a current limiting resistor R2 to the base of a signal comparator NPN transistor T1. The collector of this transistor is connected through a load resistor R3 to 35-volt conductor 14 and the emitter thereof is connected through a resistor R4 to common conductor 18. A feedback voltage hereinafter more fully described is applied through a resistor R5 to the junction between the emitter and resistor R4. The output is taken from the collector and applied through error voltage conductor Ev to three-phase firing circuit 20.

This three-phase firing circuit is provided with 35-volt supply voltage from conductors 14 and 18. It is also provided with firing pulse synchronizing voltages from power supply lines L1, L2 and L3 through conductors 22, 24 and 26, respectively. The firing pulses are applied from circuit 20 through conductor pairs 28, 30 and 32 to the semiconductor controlled rectifier bridge in controlled D.C. supply circuit 2. As will be apparent, these firing pulses control the SCR's in the controlled rectifier bridge and their firing angles are controlled by the error voltage. Three-phase firing circuits suitable for use herein are conventional in the art and the details have not been shown to avoid complicating the drawing. Reference may be had to R. W. Spink Pat. No. 3,281,645, dated Oct. 25, 1966, for a detailed illustration thereof at the lower portion of FIG. 1.

The other one of the aforementioned control circuits is a circuit for controlling inverter 8 and is shown at the lower portion of the drawing. This control circuit comprises a frequency reference potentiometer circuit, a summing D.C. amplifier circuit, a resettable voltage integrator circuit and a ring counter circuit. The first three of these circuits are supplied with 35 volts across conductors 14 and 18 and the ring counter circuit is supplied with 10 volts across conductors 16 and 18.

The aforementioned frequency reference potentiometer circuit comprises a resistor R6 connecting the upper side of potentiometer P2 to 35-volt conductor 14 and a resistor R7 and a pair of unidirectional diodes D1 and D2 connected in series from the lower side of the potentiometer to common conductor 18. The slider of this potentiometer is connected through a current limiting resistor R8 to the base of an NPN transistor T2 that is the first stage of the aforementioned summing amplifier. As will be apparent, resistors R6 and R7 limit the voltage range of the potentiometer at the upper and lower ends, respectively, and diodes D1 and D2 compensate for transistor threshold voltage drops in the first two stages of the amplifier.

The aforementioned summing D.C. amplifier circuit comprises three stages having transistors T2, T3 and T4, respectively. The 35-volt conductor is connected through a resistor R9 to the collector of NPN transistor T2 and the emitter thereof is connected through a load resistor R10 to common conductor 18. The output from the first stage that is an emitter follower stage is taken from the emitter of transistor T2 and applied through switch SW3 to the base of NPN transistor T3 of the second stage.

In this second stage, 35-volt conductor 14 is connected through a unidirectional diode D3 and a load resistor R11 to the collector of NPN transistor T3 and the emitter thereof is connected through a resistor R12 to common conductor 18. Diode D3 compensates for a transistor emitter-base voltage drop in the third stage. The second stage output is taken from the collector and applied through a current limiting resistor R13 to the base of transistor T4 in the third stage.

In this third stage, 35-volt conductor 14 is connected through a resistor R14 to the emitter of PNP transistor T4 and the collector thereof that is its output is connected to the emitter of unijunction transistor UJT in the integrator circuit. A Zener diode ZD is connected from conductor 14 to the base of transistor T4 to limit the maximum frequency to a predetermined value.

While the resettable integrator circuit may take various known forms, for illustrative purposes it is shown as a relaxation oscillator of the unijunction transistor type. Interbase voltage is applied from 35-volt conductor 14 through a resistor R15 to base B2 while base B1 is connected through a resistor R16 to common conductor 18. The emitter of the resetting unijunction transistor is connected through an integrating capacitor C1 to common conductor 18. The output is taken from base B1 and applied as a periodic input signal to ring counter 34.

This ring counter may be of conventional type and the details thereof have not been shown to avoid complicating the drawing. For example, it may be of the SCR type that functions in response to the periodic pulses from the resettable integrator circuit to apply firing pulses through six conductor pairs 36 to control firing of the SCR's in the three-phase inverter three at a time and thereby control the output frequency in accordance with the frequency of the integrator circuit. For a detailed illustration of a ring counter circuit suitable for use herein, reference may be had to the lower right-hand portion of FIG. 2b and the lower portion of FIG. 2c in the aforementioned R. L. Risberg Pat. No. 3,344,326.

For voltage regulation purposes, a feedback voltage is applied across emitter resistor R4 of transistor T1 in the comparator circuit. As shown in the drawing, this feedback may be taken from the output of the controlled D.C. supply circuit or from the three-phase inverter output depending upon the position of switch SW1. In the position shown, a circuit extends from conductor 4 through the closed contact of switch SW1 and resistor R5 to the upper end of emitter resistor R4. The return circuit extends from the lower end of emitter resistor R4 through common conductor 18 to common conductor 6. The voltage on conductor 4 is the controlled D.C. supply voltage as modified by motor operation fed back through the three-phase inverter to the filter capacitor in the output side of the controlled D.C. supply circuit.

When switch SW1 is moved to its other position, a circuit extends from the output of the three phase inverter through a conventional three-phase transformer 38 and a conventional three-phase rectifier bridge 40 to conductors 42 and 44. A continuation of this circuit extends from positive voltage conductor 42 through the then closed contact of switch SW1 and resistor R5 to the upper end of emitter resistor R4. A return path extends from the lower end of emitter resistor R4 through common conductor 18 to conductor 44.

For frequency regulation purposes, the aforementioned feedback voltage is applied from switch SW1 through switch SW2 in the position shown and then through a RC coupling circuit comprising a capacitor C2 and a resistor R17 in series to the junction between the emitter of transistor T2 and switch SW3. The return path extends from the lower end of emitter resistor R10 through conductor 18 to conductors 6 and 44. As will be apparent, the steady state frequency reference voltage is selected at potentiometer P2 and applied from the emitter of transistor T2 through switch SW3 in its closed position as shown to the base of transistor T3, and only the variation in feedback voltage is applied through the RC coupling circuit and switch SW3 to the base of transistor T3. This variation obtained from the RC coupling is added to the steady state frequency reference for regulation of the inverter output frequency.

Potentiometers P1 and P2 are mechanically coupled to one another for rotation in unison so that the steady state voltage reference and the steady state frequency reference may be adjusted together and in the same direction to maintain the volt-seconds per half-cycle output to the motor constant.

Switches SW1, SW2 and SW3 are shown for illustrative purposes only to enable illustration of several alternative circuits in one circuit diagram. In actual practice, permanent connections would be made of the desired modification without use of any such switches.

With switches SW2 and SW3 in their positions as shown, the RC coupling circuit is effective in conjunction with the frequency reference potentiometer to control the output frequency. When switches SW2 and SW3 are operated to their other position, a direct feedback coupling becomes effective for frequency regulation. For this purpose, a bias circuit in the form of a voltage divider and a direct feedback circuit are provided. The bias circuit comprises a connection from 35-volt conductor 14 through a resistor R18, the normally open contact and movable contact of switch SW3, a resistor R19 and a unidirectional diode D4 to common conductor 18. This bias circuit applies a voltage to the base of transistor T3 determinative of the minimum frequency of the output. Diode D4 compensates for the transistor voltage drop in the second stage of the amplifier since diodes D1 and D2 are ineffective when direct coupling is used. The feedback circuit comprises a connection from the movable contact of switch SW1 through the movable and normally open contacts of switch SW2, a resistor R20, and the normally open and movable contacts of switch SW3 to the base of transistor T3.

The aforementioned R. L. Risberg Pat. No. 3,344,326 shows in FIG. 2b a direct coupled connection from the controlled D.C. supply through conductor 104 and resistors 105 and 107 to the resettable integrator circuit. This prior art direct coupling is possible herein if switch SW1 is left in the position shown and switches SW2 and SW3 are moved to their other positions. This invention provides for three other alternative connections, namely, (1) RC coupled from the controlled D.C. supply by leaving all three switches in the positions shown, (2) RC coupled from the inverter output voltage by moving switch SW1 to its other position, and (3) D.C. coupled from the inverter output voltage by operating all three switches to their other positions.

The operation of the system will now be described. When power is connected and ganged potentiometers P1 and P2 are turned clockwise, transistors T1 and T2 start conducting current. Current flows from supply conductor 14 through resistor R3, the collector and emitter of transistor T1 and resistor 94 to common conductor 18. This produces an error voltage Ev and causes operation of the three-phase firing circuit. As a result, it applies firing pulses through conductor pairs 28, 30 and 32 to the SCR's of the controlled rectifier bridge in controlled D.C. supply circuit 2. This causes a D.C. output from the controlled rectifier bridge that is smoothed by the filter and applied to conductors 4 and 6. If the potentiometer is turned up in the direction of the arrow, the firing pulses are advanced in phase to increase the voltage magnitude on conductors 4 and 6. If the potentiometer is turned down, the firing pulses are retarded to decrease the magnitude of the voltage on conductors 4 and 6. The synchronizing voltages coming through conductors 22, 24 and 26 to the three-phase firing circuit insure that the firing pulses occur during positive anode voltage periods of the SCR's in the controlled rectifier bridge in circuit 2 in conventional manner.

In the frequency reference circuit, when potentiometer P2 is turned up as aforesaid, current flows from supply conductor 14 through resistor R9, the collector and emitter of transistor T2 and resistor R10 to common conductor 18. The output from the emitter of transistor T2 is applied through the closed contact of switch SW3 to the base of transistor T3 to turn it on. This causes current to flow from supply conductor 14 through diode D3, resistor R11, the collector and emitter of transistor T3 and resistor R12 to common conductor 18. The output from the collector is applied through resistor R13 to the base of transistor T4 to turn it on. As a result, current flows from supply conductor 14 through resistor R14 and the emitter and collector of transistor T4 into capacitor C1 to charge this capacitor.

The relaxation oscillator causes integration of the signal current applied to the emitter of the unijunction transistor followed by resetting, repeatedly, to provide periodic voltage pulses to the ring counter at a frequency proportional to the input signal applied to the base of transistor T4. Capacitor C1 charges to integrate the signal and when the voltage on it reaches a critical value, unijunction transistor UJT conducts in its emitter-base B1 circuit to discharge the capacitor thereby resetting the integrator. The integrator then starts another cycle of charging and resetting. Each time that the capacitor is discharged, a voltage pulse is applied from the upper end of resistor R16 to the ring counter. The ring counter responds to these pulses to apply firing pulses to the SCR's in the inverter to start the motor running.

As the motor runs and its load varies, it develops an induced voltage that might at times be higher than the controlled D.C. supply voltage coming from the source. In such case, current is fed back from the motor through the back diodes of the inverter to the filter capacitor in controlled D.C. supply circuit 2. Consequently, the voltage on conductor 4 that is fed back to the voltage reference circuit is the controlled D.C. supply voltage as modified by motor operation or, in other words, the output voltage. This voltage is fed back through resistor R5 to the upper end of resistor R4 of the comparator circuit where it is subtracted from the reference voltage to provide an error voltage Ev for control of the three-phase firing circuit.

The variation in the voltages on conductor 4 is fed back through switch SW2 and the RC coupling circuit C2, R17 and switch SW3 to the base of transistor T3. This variation voltage is added to the steady state frequency reference voltage coming from the emitter of transistor T2 and the sum thereof is applied to the base of transistor T3. The RC coupling has at least two advantages. One requirement of the system is that equal volt-seconds per half-cycle be applied to each phase of the motor to prevent D.C. and beat frequency components of current from flowing in the motor. These components would cause decelerating torques and oscillations in both speed and voltage. The alternative is a very large capacitor bank on the D.C. bus to reduce ripple to less than approximately 0.25 percent. The RC coupling provides equal volt-seconds per half-cycle provided the time constant of the coupling is longer than approximately two half-cycles.

Another of these advantages is that the RC coupling to the frequency signal provides damping of particular importance on synchronous motor applications. On drives with low inertia, sufficient damping may be provided by the motor damper characteristic alone at frequencies near rated frequency. However, even in that case, the damping will be greatly reduced at low frequencies because of the reduction in air gap flux due to stator IR drop. On the higher inertia applications, the damper simply does not provide enough damping for stable operation if cyclic loads are present. The damping provided by modulating the frequency in response to load changes and the elimination of the volt-second per half-cycle problem via the transient coupling as disclosed herein are advantageous.

While a RC circuit has been shown for the transient coupling, it will be recognized that other equivalent coupling devices such as, for example, a derivative transformer may be used therefor.

Referring to the upper portion of the drawing, it will be seen that if electrical isolation is required between the power circuit and the control circuits, an isolating transformer may be used in the feedback circuit. For this purpose, the output voltage of the inverter that is applied to the motor is also applied through isolating transformer 38 and rectifier 40 to conductors 42 and 44. By moving switch SW1 to its other position, this rectified voltage is applied from conductor 42 as a feedback voltage to both the voltage reference and frequency reference circuits in place of the feedback from the D.C. link at conductor 4.

This rectified feedback voltage may be applied either through the RC coupling circuit when switches SW2 and SW3 are left in the positions shown in the drawing and used in conjunction with the steady state frequency reference to control the output frequency, or may be applied through the direct coupling circuit when switches SW2 and SW3 are moved to their other positions and used in conjunction with the minimum frequency bias obtained from voltage divider R18, R19, D4 to control the output frequency.

It is to be understood that the invention is not intended to be confined to the particular preferred embodiments of adjustable frequency control system having feedback for voltage and frequency regulation hereinbefore described, and that they are susceptible of various modifications productive of equivalents.

We claim:

1. A control system having a power supply source, and a power circuit supplied therefrom for providing an alternating output voltage whose magnitude and frequency are proportionally adjustable and controllable, and a control circuit supplied from said source for controlling said power circuit, comprising:

controlled means in said power circuit for providing an adjustable D.C. voltage;

voltage-control means in said control circuit including adjustable, voltage-reference means for controlling said controlled means:

an inverter in said power circuit supplied with said adjustable D.C. voltage for providing an output voltage to a load device, said output voltage having an adjustable magnitude and a proportionally adjustable frequency;

and frequency-control means in said control circuit for controlling said inverter comprising:

means providing a frequency-control voltage;

resettable voltage integrator means operable by said frequency-control voltage to develop periodic voltage pulses having a frequency proportional to its magnitude for control of the inverter and its output voltage frequency;

and feedback means responsive to said output voltage for controlling said frequency-control voltage in proportion thereto to maintain constant volt-seconds per half-cycle of output voltage.

2. The invention claimed in claim 1, wherein said means providing a frequency-control voltage comprises:

frequency reference means selectively settable to provide a frequency-control voltage indicative of the steady state value of output frequency.

3. The invention defined in claim 2, wherein said feedback means comprises:

means for providing a feedback voltage proportional to the variation in said output voltage for addition to said steady state frequency-control voltage.

4. The invention defined in claim 3, wherein said feedback voltage providing means comprises:

a transient coupling of the resistor-capacitor type between the inverter output and said integrator means.

5. The invention defined in claim 1, wherein said means providing a frequency-control voltage comprises:

minimum-frequency control means for providing a control voltage indicative of the minimum frequency of said output voltage.

6. The invention defined in claim 5, wherein said feedback means comprises:

means for providing a feedback voltage proportional to said output voltage for addition to said minimum-frequency control voltage.

7. A control system having a power supply source, and a power circuit supplied therefrom for providing an alternating output voltage whose magnitude and frequency are proportionally adjustable and controllable, and a control circuit supplied from said source for controlling said power circuit, comprising:

controlled means in said power circuit for providing an adjustable D.C. voltage;

voltage-control means in said control circuit including adjustable, voltage-reference means for controlling said controlled means to adjust the value of said D.C. voltage;

an inverted in said power circuit supplied with said adjustable D.C. voltage for providing an output voltage to a load device, said output voltage having an adjustable magnitude proportional to said D.C. voltage and an adjustable frequency;

and frequency-control means in said control circuit for controlling said inverter comprising:

adjustable, frequency-reference means for providing a selectively adjustable frequency-reference voltage;

resettable voltage integrator means operable by said frequency-reference voltage to develop periodic voltage pulses having a frequency proportional to its magnitude;

means responsive to said pulses for controlling said inverter;

and feedback means comprising a transient coupling for transmitting a voltage proportional to the variation in a voltage in said power circuit to modify said frequency-reference voltage and to control the output frequency in accordance therewith.

8. The invention defined in claim 7, wherein said feedback means comprises:

a connection including said transient coupling from the adjustable D.C. voltage output of said controlled means to said resettable voltage integrator means.

9. A control system having an alternating current power supply source, and a power circuit supplied therefrom for providing an alternating current output voltage whose magnitude and frequency are proportionally adjustable and controllable, and a controlled circuit supplied from said source for controlling said power circuit, comprising:

a controlled D.C. supply circuit in said power circuit for providing an adjustable D.C. voltage;

an inverter in said power circuit supplied with said adjustable D.C. voltage for providing an output voltage to an alternating current motor, said output voltage having an adjustable magnitude proportional to said D.C. voltage and an adjustable frequency;

means in said control circuit comprising an adjustable voltage-reference circuit for providing a reference voltage, and a feedback circuit for providing a first feedback voltage proportional to said output voltage, and a comparator circuit for providing an error voltage proportional to the difference between said reference voltage and feedback voltage;

means in said control circuit responsive to said error voltage for controlling said controlled D.C. supply circuit;

and frequency-control means in said control circuit for controlling said inverter comprising:

frequency-reference means for providing a selectively adjustable frequency-reference voltage determinative of the steady state output frequency;

feedback means comprising a transient passing coupling for providing a second feedback voltage proportional to the variation in said output voltage;

resettable voltage integrator means operable by said frequency-reference voltage and said second feedback voltage to develop periodic voltage pulses having a frequency proportional to the sum of said voltages;

and means responsive to said pulses for controlling said inverter.

10. The invention defined in claim 9, wherein:

said alternating current power supply source is a three-phase source;

and said inverter is a three-phase inverter.

References Cited

UNITED STATES PATENTS

| | | | |
|---|---|---|---|
| 3,351,835 | 11/1967 | Borden et al. | 318—227 |
| 3,365,638 | 1/1968 | Risberg | 318—227X |
| 3,444,451 | 5/1969 | Schlabach et al. | 318—227 |

FOREIGN PATENTS

| | | |
|---|---|---|
| 745,840 | 3/1956 | Great Britain. |

ORIS L. RADER, Primary Examiner

G. RUBINSON, Assistant Examiner

U.S. Cl. X.R.

318—230, 231; 321—5